Oct. 29, 1963

W. GREGOR 3,108,543

FLUID MOTOR OR PUMP

Filed June 23, 1959

Inventor:
WILHELM GREGOR
By Toulmin & Toulmin
Attorneys

Oct. 29, 1963 W. GREGOR 3,108,543
FLUID MOTOR OR PUMP
Filed June 23, 1959 6 Sheets-Sheet 2

Inventor:
WILHELM GREGOR
By Toulmin & Toulmin
Attorneys

Oct. 29, 1963  W. GREGOR  3,108,543
FLUID MOTOR OR PUMP
Filed June 23, 1959  6 Sheets-Sheet 3

Inventor:
WILHELM GREGOR
By Toulmin & Toulmin
Attorneys

Oct. 29, 1963  W. GREGOR  3,108,543
FLUID MOTOR OR PUMP
Filed June 23, 1959  6 Sheets-Sheet 4

Inventor:
WILHELM GREGOR
By Toulmin & Toulmin
Attorneys

Oct. 29, 1963   W. GREGOR   3,108,543
FLUID MOTOR OR PUMP
Filed June 23, 1959   6 Sheets-Sheet 5

Inventor:
WILHELM GREGOR
By Toulmin & Toulmin
Attorneys

Oct. 29, 1963 W. GREGOR 3,108,543
FLUID MOTOR OR PUMP
Filed June 23, 1959 6 Sheets-Sheet 6

Inventor:
WILHELM GREGOR
By Toulmin & Toulmin
Attorneys

United States Patent Office
3,108,543
Patented Oct. 29, 1963

3,108,543
FLUID MOTOR OR PUMP
Wilhelm Gregor, Achim, near Bremen, Germany, assignor to Licentia Patent-Verwaltungs-G.m.b.H., Hamburg, Germany
Filed June 23, 1959, Ser. No. 822,363
4 Claims. (Cl. 103—162)

This invention relates to a fluid motor, or variable displacement pump, of the type having parallel axial cylinder bores and a swash plate mechanism for reciprocating the pistons in the bores; and also relates more particularly to a novel plate type valve mechanism in the fluid motor or pump.

It is an object of my invention to provide a fluid motor or pump of the aforesaid type which is easier to assemble and of lower weight, for equal amounts of transmitted power, than the known power transmission systems of this aforesaid fluid motor or pump type.

It is another object of my invention to provide a fluid motor or pump of the aforesaid type, wherein the connections for input and discharge are stationary, while the power transmitting means from a driving shaft to a swash plate in the mechanism comprising the latter need be laid out for low loads corresponding to low torques only, whereby the fluid motor or pump according to my invention combines the advantageous features of two of the best known systems.

It is yet another object of my invention to provide a fluid pump with infinitely variable conveyed volume of pumped fluid or a motor with a swash plate of adjustable tilting angle and thereby variable speed, which fluid pump or motor avoids the drawback of the known systems described hereinafter, and therefore firstly requires no power transmitting member transmitting the entire operational torque to a tiltable means of the system but only requires transmission of part of the operated torque and, secondly, has simple, rigid fluid feeding and discharging conduits, to and from the tiltable means, e.g. a cylinder barrel.

Other objects and advantages of the fluid motors and pumps according to my invention will become apparent from the accompanying drawings which show by way of comparison two types of known fluid pumps as well as several embodiments of the fluid motor or pump according to the present invention. In these drawings.

In FIGURES 1, 1A, 2, and 2A, there are illustrated two known systems of fluid pumps or motors having parallel axial cylinders in a cylinder barrel 1 and having a swash plate mechanism comprising a socket ring 2 and tilting box 3 (FIGURES 1 and 1A) or a corresponding tilting disc 4 (FIGURES 2 and 2A), wherein change of the angle of inclination of the tilting element or elements permits an infinitesimal adjustment of the piston strokes and thus of the power transmission effected by the system.

Figures 1, 1A, 2, 2A, 6:
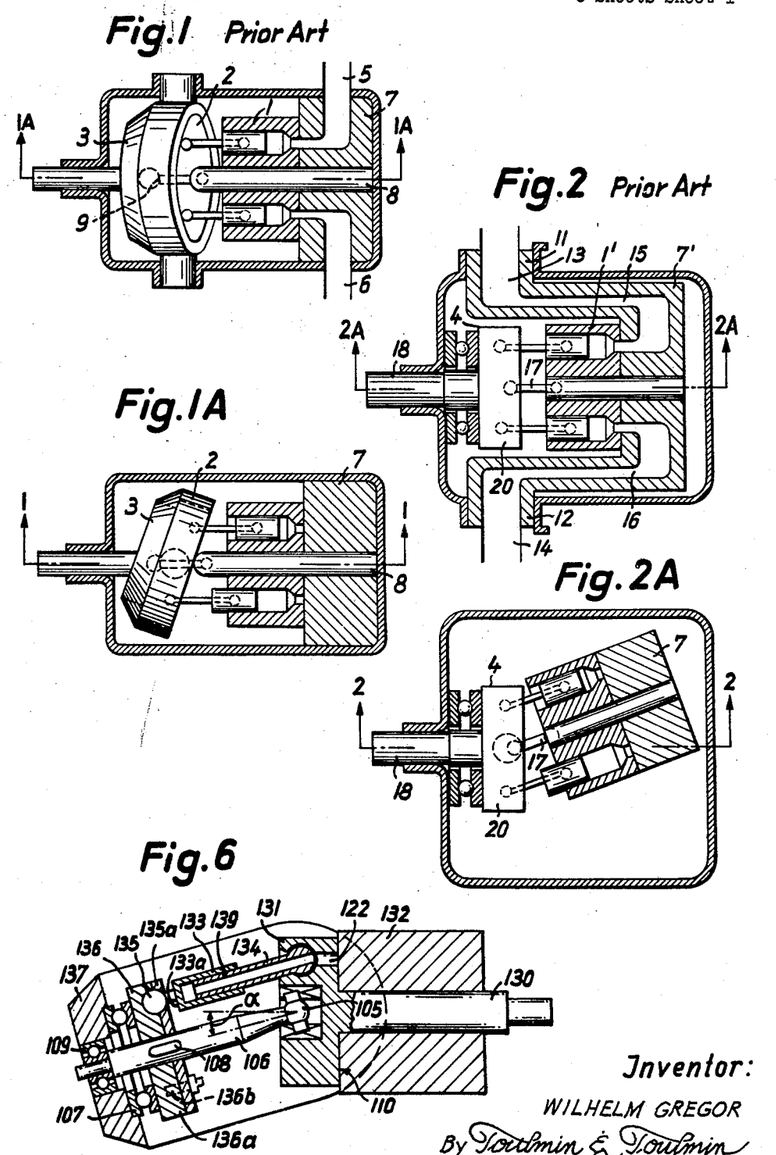
FIGURE 1 is a schematical partially sectional plan view of a known fluid pump system of the Waterbury type similar to those described, for instance, in Patents 1,156,433, 2,241,701 and others.
FIGURE 1A is a sectional elevational view along line 1A—1A in FIGURE 1.
FIGURE 2 is a schematical sectional plan view of a fluid pump system of another known construction known as the Thoma type, Hydromatic or Meer type.
FIGURE 2A is a sectional elevational view along 2A—2A in FIGURE 2.
FIGURE 6 shows another embodiment of the fluid pump or motor system according to the invention in sectional plan view.

In the known system shown in FIGURES 1 and 1A, the power transmitting fluid, for instance, a pumped liquid is sucked in by way of an intake port 5 and then discharged under pressure by way of outlet port 6 of a valve plate 7. In this system the cylinder barrel 1 is driven directly from drive shaft 8, and the socket ring 2 rotating in tilted box 3 is driven from drive shaft 8 or the cylinder barrel 1 via a schematically indicated transmitting member 9 which is illustrated in detail, for instance, in FIGURE 5 of U.S. Patent 1,156,433 and others. This known system has the advantage that the fluid medium connections are stationary and can therefore be rigid, and that the casing can be kept small. A serious drawback of these systems is, however, the fact that the transmitting member 9 must transmit the full torque generated by the tangential components of the piston forces, which torque corresponds to the full operational torque of the system.

Relative to the transmitted power rate, the assembly of the system and the weight of the same shall be considered as average.

The aforesaid drawback of this known Waterbury system has led to the development of the different known fluid transmission system which is illustrated schematically in FIGURES 2 and 2A. This system is driven from a drive shaft 18 via socket ring 20. In this second system the valve plate 7' cooperating with the cylinder barrel 1 is not stationary but forms a swash plate tiltable about pivots 11 and 12 which have central bores 13 and 14 respectively, connected through channels 15 and 16 with the respective valve openings to the cylinders in barrel 1. Due to this arrangement, the connections of the fluid medium lines to the inlet bore 13 and from the outlet bore 14 must be flexible, which is a serious drawback as compared with the first described known system. It has the further drawbacks of requiring a larger amount of work material, for instance, metal, more working steps, and more space. An advantage of this second system resides in the fact that the transmitting member 17 need only be laid out for transmission of a much smaller torque sufficient to overcome the friction between the cylinder barrel 1 and the valve plate 7', which friction depends on the residual forces of excess of pressure of the pistons, the friction coefficient, and the medium diameter between the points at which these residual forces are active.

While the maximum permissible permanent operational pressures of the first-described known system are in the order of 80 kg. per square centimeter (kg./cm.²), the second system permits of maximum operational pressures in the order of 250 kg./cm.².

Figures 3, 3A, 4, 4A, 5:
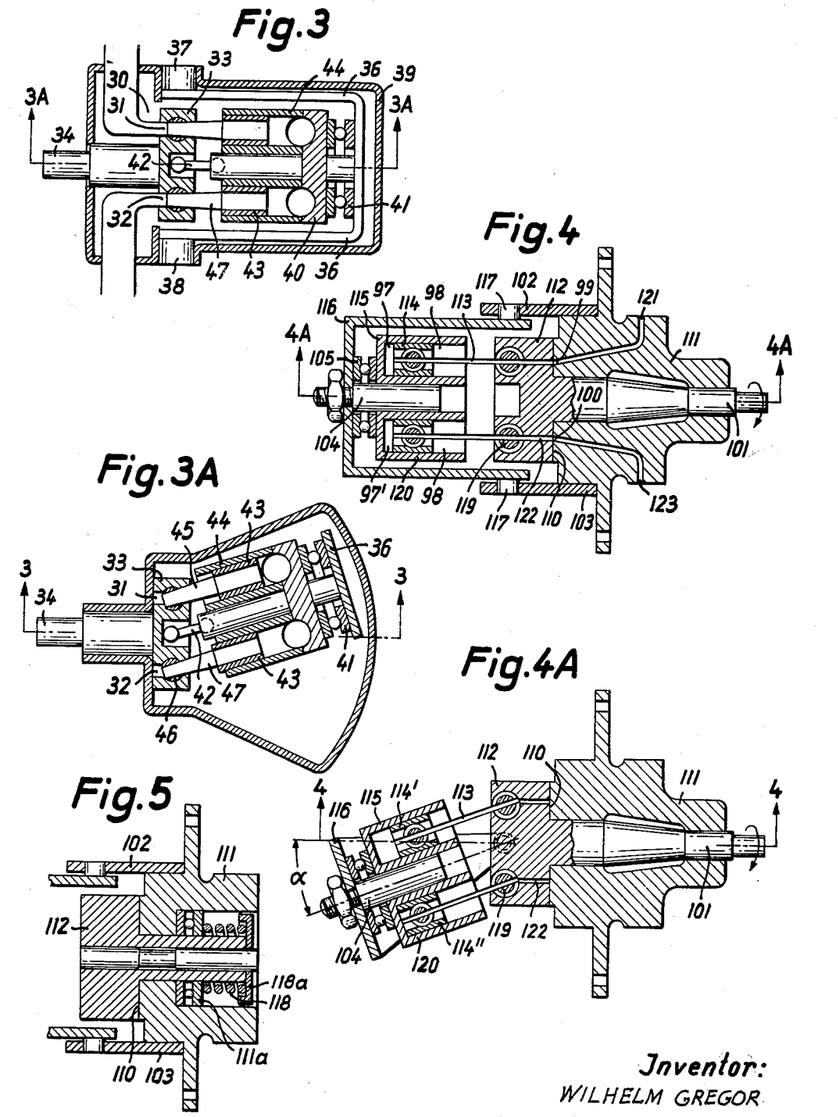
FIGURE 3 is a schematical sectional plan view of a basic embodiment of a fluid pump or motor system according to the invention.
FIGURE 3A is a sectional elevational view along line 3A—3A in FIGURE 3.
FIGURE 4 shows a sectional elevational view of the same embodiment as shown in FIGURE 3, but in more detail.
FIGURE 4A is a sectional plan view taken along line 4A—4A in FIGURE 4.
FIGURE 5 shows in sectional plan view a somewhat different embodiment of the driving flanged member of the embodiment of a fluid pump system shown in FIGURES 3 to 4A.

The drawbacks of both known systems are avoided and the objects stated hereinbefore are attained by the new fluid pump or motor system according to my invention which is basically represented in FIGURES 3 and 3A and comprises a stationary valve plate 30 with rigid fluid inlet and discharge openings 31 and 32, respectively, therein; a socket ring 33 mounted on drive shaft 34 for rotation therewith and provided with channels 34 and 35 registering alternatingly with openings 31 and 32; a tiltable cylinder barrel frame or cage 36 pivotably mounted about pins 37 and 38 in a casing 39 and containing a cylinder barrel 40 supported on rotary bearings 41 and adapted for being driven via a transmission member 42 from drive shaft 34 and/or socket ring 33. Pistons 43 are adapted for reciprocation in cylinders 44 of cylinder barrel 40 and connected via connecting rods 45 to ball joints 46 in socket ring 33.

It is an important feature that longitudinal bores 47 provided in a manner known per se through ball joints 46, connecting rods 45 and pistons 43 serve as a passageway for the fluid to be pumped from inlet opening 31 to the pumping chamber 48 in cylinders 44 and from the latter to discharge opening 32 in valve plate 30.

Longitudinal bores through ball joints, connecting rods and cylinders had already been provided for lubrication purposes only. By now having them communicate with the fluid inlet and outlet openings in the stationary valve disc 30, on the one hand, and with the actual pumping or compression space in the cylinders 44 on the other hand, there is provided a fluid motor or pump system which combines the advantageous feature of a stationary fluid inlet and discharge means 30 corresponding to part 7 in FIGURES 1 and 1A, with a tiltable cylinder barrel and frame 1' and 7' in FIGURES 2 and 2A, and a transmitting means 17 or 42 between the cylinder barrel and the drive shaft, 18 or 34 respectively, which transmitting means is only required to transmit a fraction of the total operational load.

In a practical example this new system permits to pump maximally 136 liters per minute at a pressure between 40 and 100 kg./cm.². The massive cylinder barrel is largely reduced and subdivided into individual cylinders and a very compact structure is obtained which requires only a small casing and has correspondingly less weight. While a pump of one of the second conventional system and equal pumping effect would weigh together with its casing, e.g., about 390 kg., the weight of a corresponding pump according to the invention only amounts to 105 kg., the manufacturing costs are correspondingly lower.

Assembly and checking of the pump or motor according to the invention are also much more easily effected than with the known systems.

Figures 7, 8, 8A:
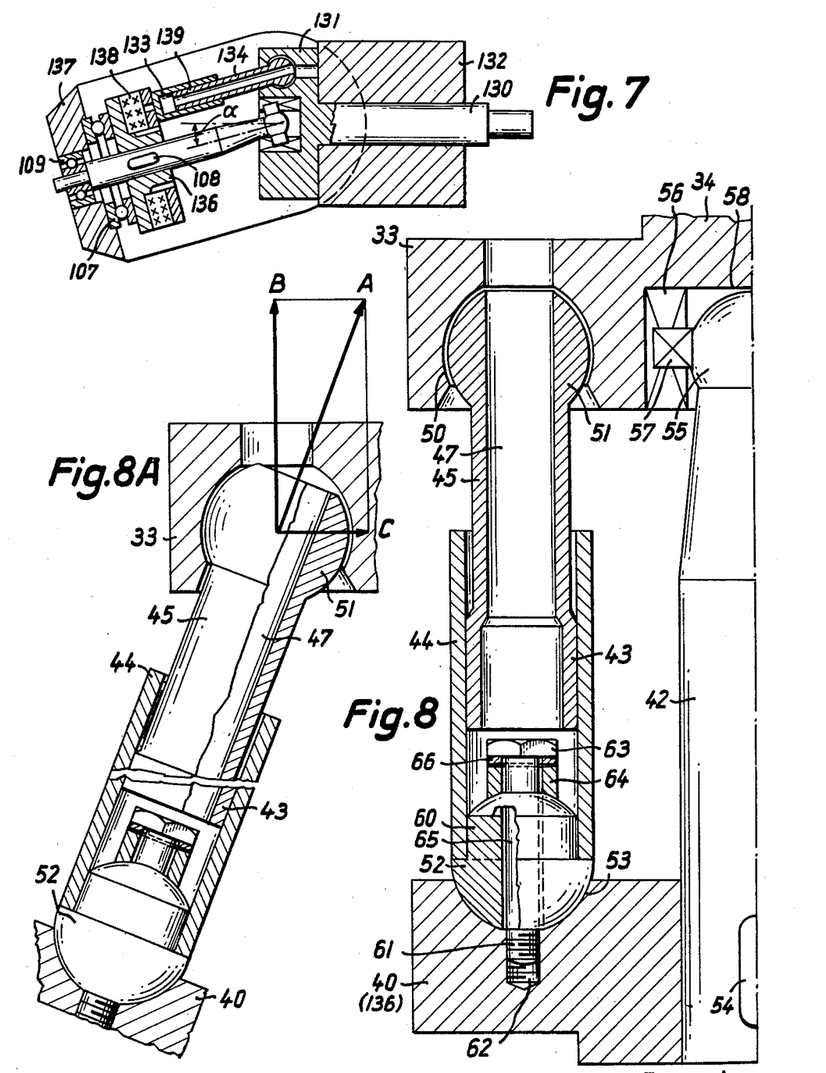
FIGURE 7 shows yet another embodiment of the fluid pump or motor system according to the invention, also in sectional plan view.
FIGURE 8 illustrates in sectional view a detail of the embodiment shown in FIGURE 6.
FIGURE 8A illustrates in sectional view the detail illustrated in FIGURE 8 in an operating position.

Among the general features of the fluid motor or pump according to the invention there shall be mentioned that the driving and the driven members of the machine are coaxially connected to the driving socket ring 33 which may be in the form of a drive flange which is illustrated in FIGURE 8 as integral with, or may be rigidly mounted on the driving shaft 34, and is provided with ball sockets 50 for receiving therein the ball-shaped ends 51 of the connecting rods which bear at their opposite ends pistons 43. These pistons reciprocate, as mentioned before, in cylinders 44 which in turn rest by means of spherical end caps 52 in corresponding sockets or wells 53 of cylinder barrel 40.

Torque transmission between drive flange (or socket ring) 33 and cylinder barrel 40 may be effected either by a universal joint type transmitting member 42 rigidly connected by key 54 to barrel 40 in FIGURE 8 and bearing at its other end a ball-type joint 55 articulatedly held between plane faces 56, 57 in a central recess 58 of drive flange 33. Or the transmission of torque may be effected without the use of such a universal joint in a manner known per se via the outside of the cylinders and the pistons and the connecting rods themselves to the drive flange.

In the fluid pumps or motors according to the invention, the introduction and discharge of the pumped fluid take place by way of the hollow connecting rods, the ball joints of the ends of the connecting rods each being provided with one or several channels as a continuation of the bore in the connecting rod itself. The pumped fluid passes through corresponding channels in the socket ring (driving flange) to control slots or openings in an either substantially planar or preferably cylindrical control surface in which the feed and discharge lines for the fluid being pumped end in a conventional manner.

This control surface need not necessarily be planar or cylindrical, but may also be more or less conical or spherical in shape. The control surface may also be shaped as a cylindrical, conical or spherical pin or pivot.

Various embodiments of the fluid pump or motor according to the invention are illustrated in FIGURES 4, 4A, 5, 6, 7 and 9 to 14 of the drawings.

A first embodiment of a swash-plate-type pump according to the invention and its mode of operation will be explained with reference to FIGURES 4 and 4A of the accompanying drawings, and the description will be based on the assumption that the represented machine is a pump for the conveyance of liquid. FIGURES 4 and 4A show longitudinal sections along planes at right angles to one another.

In these figures as well as in FIGURE 5, a stationary supporting body 111 forms a bearing for a spindle 101 which may be connected to a driving motor (not shown), and which is widened at the left-hand end, as seen in the drawings, to form a drive flange 112. The face of the supporting body 111 which faces the drive flange 112 is smooth and forms a planar control face 110 which contains arcuate control grooves or openings 99, 100 (FIGURE 10) into one of which, 99, there opens, for instance, the suction channel 121, and into the other, 100, for instance, the discharge channel 123 of the pump. Two brackets 102 and 103 are firmly connected to the supporting body 111 at diametrically opposite sides thereof and form bearings for pivot pins 117 of a yoke 116. Thus, this yoke 116 can be angularly displaced about the pivot pins 117 to adjust the centre line of the yoke in an inclined position at a determined angle in respect of the axis of the spindle 101. The yoke 116 has a central inwardly projecting guide pin 104 which is coaxial with the centre line of the yoke and is surrounded by a cylinder barrel 115 which has several, preferably an odd number of cylindrical bores with their axes parallel to the axis of the pin 101 of which two bores 98 are shown at diametrically opposite sides of the pin axis. These cylindrical bores 98, which are open at the side of the drive flange 112, form the cylinders of the pump. The cylinder barrel 115 is free to rotate about the guide pin 104 and is supported from the yoke through a thrust ball bearing 105.

Each cylinder holds a piston 114 open at both its end faces and a hollow connecting rod 113. The connecting rod 113 extends through the piston so that its left-hand open end opens into the working space 97, 97' of the cylinder and the connecting rod 113 is anchored within the piston 114 by means of a ball joint 120 so as to be free to assume an angular position different from that of the cylinder axis. The other end of each connecting rod 113 is similarly mounted by means of a ball joint 119 within a corresponding cavity of the drive flange 112, which ball joint also contains a bore registering with that of rod 113. The cavities in the drive flange 112, which accommodate the ball joints 119 at the outer ends of the connecting rods 114 are connected by channels 122 to the control face 110 of the stationary supporting body 111. Thus, in the position shown in FIGURE 4, free communication is established between the suction channel 121 and the working space 97 of the one cylinder, as well as between the working space 97' of the other cylinder and the discharge channel 123.

When the spindle 101 is rotated and the yoke 116 is adjusted so that its central line is coaxial with the axis of the spindle 101, no pumping effect is obtained because no axial displacement of the pistons 114 within their cylinder takes place. When, however, the yoke 116 is angularly displaced so that the axis of its guide pin 104 assumes a position at an angle α in respect of the axis of the spindle 101, as shown in FIGURE 4A, it will be appreciated that the cylinder barrel 115, which contains the cylinders, carries out a movement similar to that of a swash-plate in respect of the drive flange 112, and it will be observed that, in the position shown in FIGURE 4A, the piston 114' of the upper cylinder is withdrawn from its cylinder to increase the working space (suction stroke), whilst the piston 114" of the lower cylinder is forced into the cylinder to reduce the working space (delivery stroke).

While the one of the principal advantages of the fluid motor or pump according to my invention resides in the fact that the feeding and discharge of the compressed or pumped fluid take place exclusively by way of the stationary supporting body 111, another important advantage of the described pump resides in that it permits of an infinitely variable adjustment of the quantity of the conveyed liquid which adjustment can be achieved simply by adjusting the deflection of the yoke 116 (angle α) which supports the cylinder barrel 115; if the machine is used as a motor, a finely adjustable variation of the rotary speed of the motor is made possible by the same adjustment. Thereby, no adjustment operations are required at any adjusting device that might have to be connected to the pump housing or the oil tank that preferably encloses the pump.

Of course, the direction of fluid conveyance through the pump can be inversed in a manner known per se by either reversing the sense of rotation of the system or changing the direction in which the axis of pin 104 deviates from the axis of shaft 101 to the opposite side.

Shaft 101 can also be omitted or placed entirely into the driving motor whereby a corresponding coupling means between the longitudinally and transversely guided drive flange becomes necessary, as will be described hereinafter.

In order to prevent lifting of the drive flange 112 off the control face 110 of supporting body 111, when the machine operates without pressure, there can be provided resilient means such as a compressible spring 118 shown in FIGURE 5, which spring urges drive flange 112 into contact with control face 110 by acting upon a clamp disc 118a embedded in shaft 101, on the one hand, and rotary bearing resting on the bottom of a recess 111a in body 111, on the other hand. I have also found that an accurate and stress-resistant manufacture of the ball joints which are to connect the tubular connecting rods 113 with the pistons 114 meets with considerable difficulties, mainly due to the small space available for these joints. It is, therefore, a further object of the present invention to overcome these difficulties and, generally, to improve the performance of these swash-plate-type fluid pumps or motors.

To this end, a swash-plate-type pump of engine which comprises a spindle with a drive flange rotatably mounted in a stationary supporting member, a yoke pivotally mounted on the stationary member about pivot pins at right angles to the spindle axis so that the center line of the yoke can be inclined with respect to the spindle axis, at least one pair of cylinders supported by the end wall of the yoke and mounted to rotate about the center line of the yoke, and a hollow connecting rod for each cylinder which opens into the working space of the cylinder and is anchored by a ball and socket joint within the said drive flange, is characterized, according to the preferred embodiment of my invention, in that each connecting rod is guided in the cylinder so that the relative movement of these members during operation is along a common axis, and that the end wall of each individual cylinder is linked by a universal joint to a swash-plate or socket ring which is rotatably supported by the end wall of the yoke. The universal joint may be constituted by a ball and socket joint, or by a rubber block fastened on the one hand to the cylinder end and on the other hand to the socket ring. It will be appreciated that by removing the conventional universal joint from the inside of the piston and by providing instead a universal joint or resilient block outside each individual cylinder connecting the same individually to its respective supporting socket on the socket ring and thereby on the deflecting shaft, the manufacture and repair of this type of machine is greatly simplified and facilitated.

By replacing the cylinder barrel used in the preceding embodiments by individual cylinders which are displaceable independently of each other, it is now possible to manufacture the pistons as well as the connecting rods in a simple manner each from a single work piece.

The universal joint means which allow for a random tilting of the cylinders in all directions relative to the cylinder-supporting socket ring can be provided at any other convenient position on the cylinders, for instance, at the bottom, at the middle, or at the upper end of the cylinders. It is of advantage, if the cylinders are universally connected approximately at the level of their center of gravity in order to avoid additional tipping momenta that might arise in the motor or pump due to the occurrence of centrifugal forces.

In the case of supporting the cylinders in cushions of elastic material, the blocks of the latter material absorb, on the one hand, the forces of return pressure and centrifugal forces, and, on the other hand, these elastic blocks make possible the kinematically required tiltability of the cylinders. It is a known fact that the cylinder and piston are still in movement relative to each other whenever communication with the suction side of the pump line has just been interrupted and before communication with the discharge side is established, thus causing a change in pressure of the conveyed fluid. These pressure changes as well as those occurring when communication is changed in the opposite sense impose shock-like heavy loads on the bearings of the connecting rods and cylinders.

A resilient support for the cylinders as provided in the embodiment according to the invention shown in FIGURE 7 will damp these shocks and thereby reduce the stresses on all parts of the machine as well as the noise caused by the machine in operation. This embodiment is, therefore, particularly suited when building fluid machines for silent running.

According to another feature of the invention, the universal joints associated with the cylinders can be lubricated directly through the bores provided in the connecting rods, pistons, and cylinders, provided, of course, that the pumped or compressed fluid is at the same time a lubricant. In this case, check valves must be provided between the pressure and the suction side to avoid an undesirable reflux of the pumped fluid from the side of higher to that of lower pressure.

In order that these embodiments of my invention may be clearly understood, they will now be described in more detail with reference to FIGURES 6 and 7 of the accompanying drawings.

Referring first to FIGURE 6, here again a supporting body 132 is shown which forms a bearing for the spindle 130 and which also forms bearings (not shown but similar to 37, 38 in FIGURE 3) for the pivot pins of tiltable yoke 137, which is shown tilted through an angle α. At the left-hand end of the spindle 130 (in FIGURE 6) there is again mounted the drive flange 131 which is provided with the cavities for the ball joints 119 of the hollow piston rods 134 and with the connecting channels 122 to the control face 110 of the supporting body 32, the control channels in the supporting body are not shown but are similar to 31, 32 in FIGURE 3. In contrast to the arrangement shown in FIGURES 4 and 4A, the central guide pin 106 is rotatably mounted in the end wall of the yoke 137 by means of a ball bearing 107, and it is universally articulatedly extended towards the drive flange 131 and mounted therein so that it is free to carry out a tilting movement with respect to the axis of the spindle 130, but is at the same time caused to revolve in unison with this spindle 130. Its tilting point lies 105 on the axis of the pivot pins about which the yoke 137 can be deflected which axis extends perpendicularly to the axes of spindle 130 and pin 106. Mounted on the guide pin 106 and keyed to it is a swash-plate or socket ring 136, which is supported in an axial direction from the end wall of the yoke 137 by means of a thrust bearing 109. The socket ring 136 has cavities to receive therein the spherical pivots 135 mounted on the end face 133a of each cylinder 133. As a result of this construction, each cylinder 133 can follow the tilting motion of its connecting rod 134, and consequently the piston and cylinder construction is substantially simplified, in fact the piston 139 can be formed by the end of the hollow connecting rod 134 as shown. Since the socket ring 136 is caused to follow the rotary movement of the spindle 130 by means of the guide pin 106, no transverse forces occur between the connecting rod and cylinder so that a smooth reciprocating movement of the cylinder with respect to the connecting rod free from any jamming is ensured, regardless of the rotation of spindle 130 or an angular displacement of the yoke 137, and the consequent changes in angle α.

An embodiment of the fluid motor or pump provided with resilient cushions for the cylinders 133 is shown in FIGURE 7. It differs from that represented in FIGURE 6 in that the cylinders 133 do not carry any ball joints 135 at their end walls but instead bear fixed thereon a ring 138 of resilient material which is divided into segments or cushions. The segments of ring 138, which are resilient in all directions, render the cylinders 133 capable of tilting movement, and likewise enable them to adapt themselves to the tilting movements of the connecting rods 134 in such a manner that both parts can always move coaxially aligned to one another free from any jamming effects. In addition, the segments of ring 138 also have the above-mentioned damping effect on shocks and sound.

In the embodiment described in connection with FIGURE 6, the individual piston-cylinder 134—133 sets are supported by means of the above-described ball-joints 135 in the socket ring 136 which in turn is mounted on tiltable shaft 106 and rigidly connected thereto by means of key 108. In order to mount the ball joints in the socket ring, divided flange portions of the latter are required. Also, this arrangement leads to a relatively long construction. Those shell portions 135a of the socket cavity enclosing the ball of ball joint 135 must support the tensile stresses exercised on them by the pull of the cylinder away from the socket ring 136 during each suction stroke, and must therefore be secured on the base portion 136a by means of bolt and nut connections 136b, if an even more compli- cated construction using individual divided fastening caps for each of the ball joints 135 is to be avoided.

Therefore, a preferred arrangement of the socket-ring-to-ball-joint connection in the embodiment of FIGURE 6 will be described further in detail in connection with FIGURE 8. In this arrangement, the end face of each cylinder is devised in the form of the above-mentioned spherical end caps 52, so that the cylinder 44 is supported directly in the socket or well 53 of the socket ring 136 which is, in this embodiment, mechanically equivalent to end wall of the above-mentioned cylinder barrel 40.

According to another important feature of the detail arrangement shown in FIGURE 8, the bottom 60 bearing the cap 52 of the cylinder is held in contact with well 52 by means of a threaded bolt 61 screwed into a corresponding threaded bore 62 of cylinder barrel 40 (or the undivided socket ring 136), the head 63 of which bolt 61 is seated on the inwardly directed rim of sleeve 64 being mounted on ball-shaped cylinder bottom 60. Bolt 61 passes with sufficient play through a central bore 65 through the cylinder bottom 60 and cap 52, so as to allow for the slight angular deflections of the cylinder-piston assembly during the operation of the motor or pump.

Bolt head 63 is of smaller diameter than the inner diameter of hollow piston 43, so that the stroke of the latter in cylinder 44 is not shortened by the bolt protruding into the cylinder interior. Deflection is further facilitated by providing a resilient element such as a leaf spring 66 (FIGURES 8 and 9A) which elastically urges the cap 52 of cylinder bottom 60 into contact with the concave surface of well 53.

In order to facilitate lubrication, this spring 66 may be so laid out that during each suction stroke a narrow gap is formed between cap 52 and the surface of well 53, by way of which gap fluid surrounding the piston-cylinder arrangement can be suctioned between cap and well surface.

Looking particularly at the illustration of FIG. 8, the following forces will occur between cap 52 and ring 136. Upon rotation of socket ring 136 and of cylinder 44, there will be a centrifugal force directed to the left in the drawing, there will be the torque transfer force perpendicular to the plane of the drawing; when piston 43 leaves cylinder 44 there will be suction, which is an axial force of the cylinder piston arrangement, and which is directed upwardly (in the drawing), and which force is taken up by the resilient leaf spring 66; when piston 43 enters cylinder 44, the corresponding force is directed downwardly (in the drawing). This latter force together with the centrifugal force and the torque transfer urges cap 52 into socket 53 while the play of bolt 66 permits a restricted yielding. This latter force is therefore taken up by the ring 136.

In order to prevent bolt head 63 from exercizing excessive pressure against sleeve 64 and so as to secure sufficient deflectibility of cap 52 in well 53, there may be provided a collar, or stop pin or the like conventional means for securing the bolt 61 against rotation in bore 62 once it has been screwed in the appropriate distance.

It will occur that the stroke of a piston is to be adjusted while the pump is at a standstill. If, at that occasion, the connecting ball joint 51 in the drive flange 33 happens to be in such position that the opening of channel 47 registers with a wall portion of control face 110 intermediate openings 99 and 100, the pumped fluid in channel 47 (or 122) cannot escape in this position of the parts; therefore, in order to enable nevertheless the respective piston to carry out a pressure stroke, an excess pressure relief valve 90 of known type is provided at this point in the supporting body 132. By way of this valve 90, fluid can be pressed out of the respective cylinder piston space.

If, on the other hand, the pump element to be adjusted is to carry out a suction stroke, the excess pressure relief valve 90 will not open. The need of installing a second relief valve responding to this specific condition is eliminated by the provision of the above-described spring 66 which permits opening of a gap between the cap 52 and well 53 (FIGURE 8) during a suction stroke so that fluid may penetrate via this gap and the free space between bolt 61 and bore 65 and past spring 66 or special apertures in sleeve 64 (not shown) into the interior cylinder-piston space.

Since the same gap-formation occurs at each suction stroke of the pump, adequate lubrication of the cylinder caps 52 in wells 53 is guaranteed.

In the embodiment illustrated in FIGURES 9 to 14, all parts identical with those already described bear the respective reference numerals.

This pump is a hydrostatic piston pump with infinitely adjustable conveyed fluid volume and reversible supply and discharge sides. It possesses an uneven number of cylinders and pistons which are disposed parallel to each other about a parallel rotary axis. The amount of conveyed fluid is varied by corresponding adjustment of the piston stroke. This device can serve as a hydraulic motor by feeding with a fluid, for instance, oil, under pressure.

Figures 9, 9A:
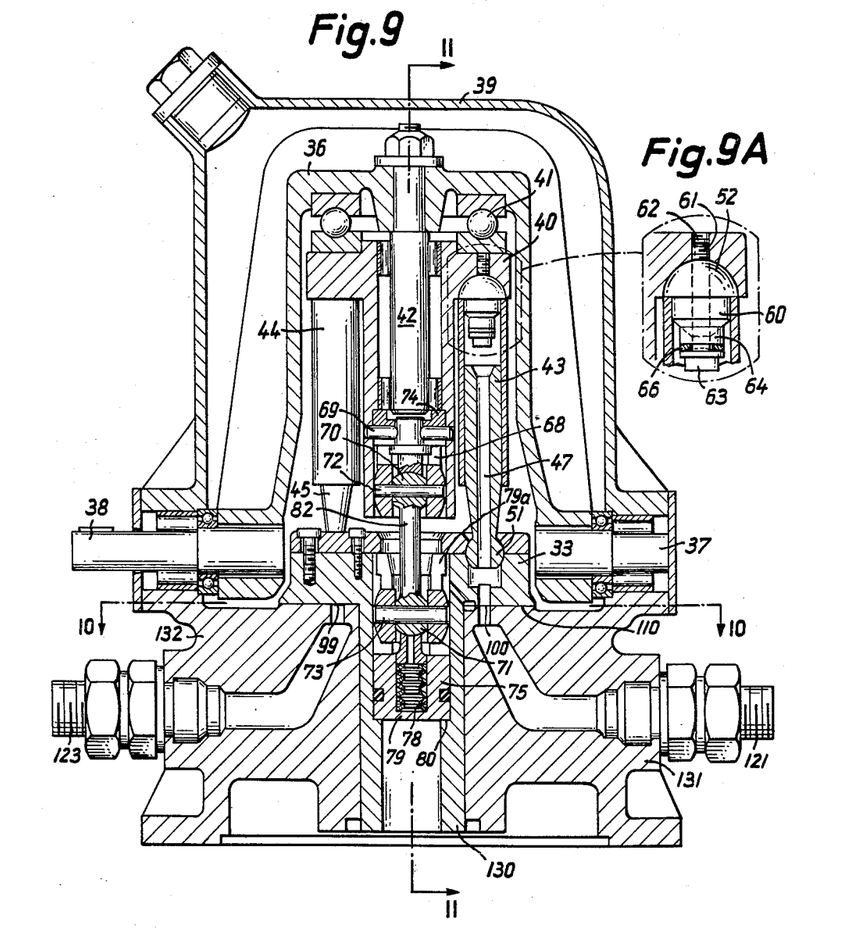
FIGURE 9 illustrates in sectional elevational front view a preferred embodiment of a fluid pump according to the invention.
FIGURE 9A shows a detail of FIGURE 9 on a larger scale.
Figure 10:
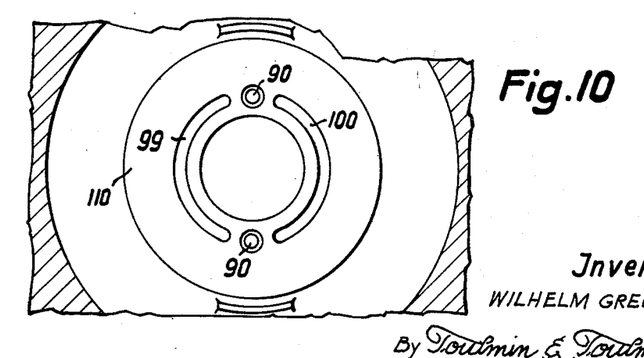
FIGURE 10 is a bottom view of another detail of FIGURE 9.

This embodiment comprises the stationary supporting body 132 in a central bore of which there is supported for rotation therein a hollow driving shaft 130 provided with a flange 33, on the one hand, and tiltable frame 36 supported on pivot pins 37 and 38 turning on rotary bearings in supporting body 132, on the other hand. An uneven number of assemblies of pistons 43 and cylinders 44 is arranged between flange 33 and barrel 40 which in turn is supported rotatably on guide pin 42, the latter being mounted centrally in frame 36 as described hereinbefore. When frame 36 is undeflected, i.e. angle α is equal zero, shaft 130 and pin 42 are axially aligned with each other.

Driving shaft 130 is continuously driven, for instance, from a motor (not shown) at a constant speed. The face 33a of flange 33 facing away from the cylinder-piston assemblies contacts supporting body 132 to form control face 110 therebetween, so as to act as a slide control valve steering supply and discharge of the conveyed fluid from and to fluid conveying channels 121 and 123, respectively. The flange 33 thus serves simultaneously as slide valve body and as axial bearing.

Casing 39 encloses the entire tiltable arrangement and is sealed to supporting body 132 against losses of oil by means of gaskets (not shown) and packing rings 83 (FIGURE 9) where pins 37 and 38 pass through the casing 39.

This embodiment shows in particular the torque-transmitting member 82 in greater detail. This member 82 connects driving shaft 130 with drive flange 33, on the one hand, and with tiltable guide pin 42 on the other hand. Member 82 is provided with Cardan or ball joints 70 and 71 at either end, each of which joints is provided with a transverse bore through which pass pins 72 and 73, each of which is held for limited displacement in the direction of the axis of shaft 130 but secured in a manner described below in connection with FIGURES 12 to 14, against rotation relative to shaft 130 and pin 42 in clawbearing cup-shaped members 74 and 75, so that rotation of shaft 130 causes rotation of pin 42 uniformly therewith.

Figures 12, 13, 14:
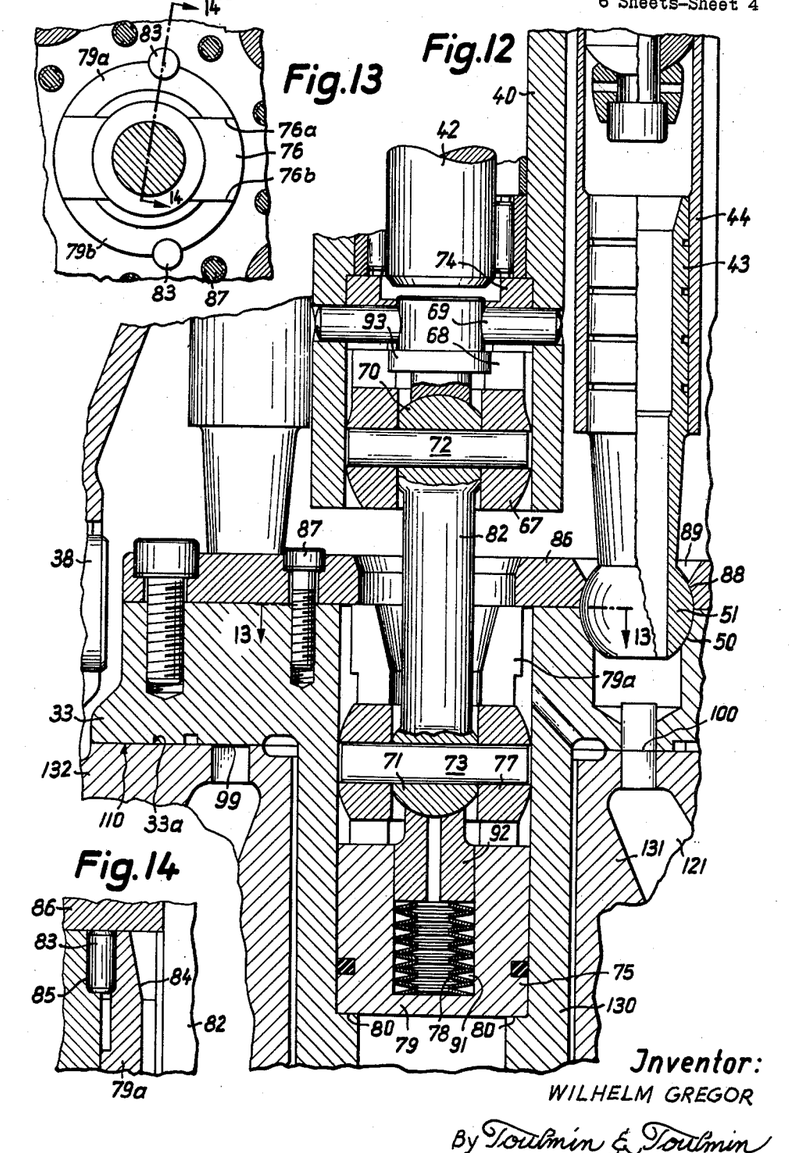
FIGURE 12 shows on an enlarged scale the central region of FIGURE 9, comprising the transmitting member 42.
FIGURE 13 is a sectional view of part of the region shown in FIGURE 12 taken along line 13—13 therein.
FIGURE 14 is a sectional view of a detail of FIGURE 13, taken along line 14—14 therein.

As shown more particularly in FIGURES 13 and 14, cup-shaped member 75 which is provided with two claws 79a and 79b is secured against rotation in the interior of the bore of drive shaft 130 by means of securing pins 83 placed in corresponding grooves 84 of claw 79a or 79b, and 85 of the wall of the central bore in drive flange 33.

Pins 83 are held in place by lid 86 which is secured to drive flange 33 by means of threaded bolts 87. Concavely-shaped surfaces 88 of openings 89 in lid 86 hold balls 51 of the piston connecting rods 47 in place against their sockets 50.

The planar surfaces 76a and 76b of recess 76 between claws 79a and 79b guide sliding heads 77 mounted on pin 72 on both sides of ball end 71 of transmitting member 82.

In a similar manner sliding heads 67 mounted on pin 72 on both sides of ball end 70 of member 82 slide in a recess between jaws 68 of cup-shaped member 74 which is in turn connected by pins 69 to cylinder barrel 40.

Torque is thus transmitted from drive shaft 130 via pins 83, cup-shaped member 75, heads 77, pin 72, member 82, pin 72, heads 67, cup-shaped member 74, and pins 69 to cylinder barrel 40.

As shown in detail in FIGURE 12, contact along control face 110 between drive flange 33 and supporting body 132 is maintained at all times owing to axial forces generated by a spring means 78 such as a coil housed in the aforesaid cup-shaped member 75. One end of the spring 78 rests on the bottom of the cup 91 in member 75. The other spring end presses a ball socket member 92 which is slightly axially displaceably guided in the walls of cup 91, against the lower end of ball 71 of the ball and pin assembly of transmitting member 82, while the first-mentioned end of spring 78 urges member 75 into abutment against a shoulder 80 in the interior bore of drive shaft 130 whenever parts 33 and 132 tend to separate.

Pressure from spring 78 is thus transmitted via socket member 92, and ball end 71, to the other ball end 70 of transmitting member 82, which ball end 70 is supported on the ball socket 93. The latter is pressure-seated in cup-shaped member 74. The latter urges cylinder barrel 40, via pins 69, against the axial bearings 41 (FIGURE 9), thus generating a force which, on the one hand, urges drive flange 33 into contact with supporting body 132, and, on the other hand, maintains the necessary constant operational pressure on bearings 41, so that the ball-shaped ends of the cylinders can not be pressed outwardly due to occurring centrifugal forces, and so that the pump is further capable of carrying out suction strokes during which pull is exercised contrary to the compression or conveying strokes which generate pressure in the system. These means are provided to ensure perfect contact at lower fluid pressures. At higher pressures of the conveyed fluid, contact is ensured automatically due to the fact that flange 33 is pressed more strongly against supporting body 132 by the compressed conveyed fluid itself.

Figure 11:
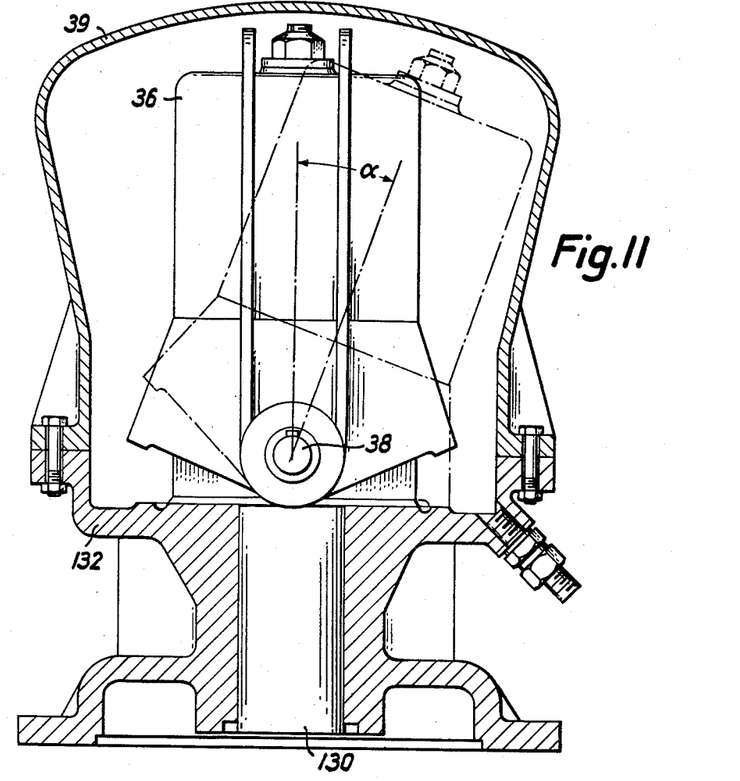
FIGURE 11 is a lateral partially sectional view of the embodiment shown in FIGURE 9.

In FIGURE 11, yoke 36 is shown in dash-dotted lines in a position deflected by angle α from the axis of shaft 101. Tilting is effected by, for instance, a key applied to pin 38 at 84.

The conveyed fluid passes through channels 121, 123, ending in arcuate slots 100, 99, and through short narrow channels into and out of the hollow pistons 43 and cylinders 44 depending on the suction strokes of the pistons on one side, for instance, that of arcuate slot 100, and expelling strokes on the opposite side, for instance, of arcuate slot 99, or vice-versa. The direction of flow of conveyed fluid depends on the side toward which the frame 39 is tilted (FIGURE 11). The amount of fluid conveyed with each rotation of the pump depends on the size of tilting angle α. Maximum stroke is attained at an angle α of about 20°.

The forces acting on drive flange 33 are largely hydraulically balanced. Remaining forces are absorbed by an axial or thrust bearing with wedge-shaped bearing segments. The ball-shaped ends of the pistons are also substantially completely hydraulically equilibrated, so that all stressing forces are reduced to a minimum. The oscillatory movement of the ball-shaped cylinder caps 52 is minimal and these caps are so largely dimensioned that they are stressed relatively little.

Pumps which convey fluid in a closed circle require means for automatically replacing the losses of fluid due to leakage. Suction valves can be provided for this purpose in the supporting body 132 which valves open into, for instance, channel 121 and/or 123.

It will be understood that this invention is susceptible to modification in order to adapt it to different usages and

I claim:

1. A fluid torque-transmitting machine comprising a stationary supporting member, a spindle, a drive flange rigidly mounted on said spindle and having at least one socket, said spindle being mounted for rotation in said supporting member, a yoke, pivot pins on which said yoke is pivotally mounted on said supporting member, said pivot pins being aligned on an axis at right angles to the axis of said spindle so that the center line of the yoke can be inclined with respect to the spindle axis, a cylinder barrel mounted for rotation in said yoke and having its rotary axis at right angle to said pin axis, at least one hollow connecting rod terminating on one end in a hollow piston and terminating with its other end in a ball received for connection in said socket of said drive flange for universally articulatedly connecting said piston to said flange, a tube having a cylinder and bottom, said piston being displaceably disposed in said cylinder in such a manner that the relative movement of the piston and cylinder to each other during operation of said pump or motor is along a common axis, said tube being mounted with its bottom on said cylinder barrel so that upon movement of said piston into said cylinder, the force exerted upon said cylinder traverses said cylinder barrel, and resilient means for articulatedly connecting the bottom of said tube having a cylinder to said cylinder barrel to take up the suction force during the suction stroke of said piston in said cylinder.

2. The machine as described in claim 1 and comprising bolt means fitting with play in said tube, and being fastened rigidly in said cylinder barrel, said bolt means being adapted for holding said tube resiliently in contact with said cylinder barrel through said resilient means.

3. The machine as described in claim 1 wherein said resilient means is a resilient layer interposed between the bottom of said tube and said cylinder barrel.

4. The machine as set forth in claim 1, said stationary supporting member having a control face there being two openings in said face, separate channels in said stationary supporting member for feeding and for withdrawing conveyed fluid from and to said two openings in said control face, respectively; said drive flange engaging said control face and being provided with channel means for alternatingly registering with said control face openings during rotation of said drive flange, said channel means terminating in said socket, said ball having a bore communicating with both, said channel means and said hollow connecting rod; and resilient means for maintaining said drive flange in contact with said control face.

References Cited in the file of this patent

UNITED STATES PATENTS

| | | |
|---|---|---|
| 957,984 | Mowry | May 17, 1910 |
| 1,137,283 | Pratt | Apr. 27, 1915 |
| 1,931,969 | Thoma | Oct. 24, 1933 |
| 2,146,133 | Tweedale | Feb. 7, 1939 |
| 2,157,692 | Doe et al. | May 9, 1939 |
| 2,240,121 | Patterson | Apr. 29, 1941 |
| 2,250,512 | Vickers | July 29, 1941 |
| 2,290,764 | Neuland | July 21, 1942 |
| 2,312,470 | Julien | Mar. 2, 1943 |
| 2,421,846 | Neuland | June 10, 1947 |
| 2,752,214 | Ferris | June 26, 1956 |
| 2,875,701 | Ebert | Mar. 3, 1959 |
| 2,900,921 | Brown | Aug. 25, 1959 |

FOREIGN PATENTS

| | | |
|---|---|---|
| 809,666 | Great Britain | Feb. 25, 1959 |
| 136,471 | Switzerland | Jan. 16, 1930 |
| 437,568 | France | Feb. 22, 1912 |